United States Patent [19]

Jenelle

[11] Patent Number: 5,500,119
[45] Date of Patent: Mar. 19, 1996

[54] SUBMERGED FIXED MEDIA FOR NITRIFICATION

[76] Inventor: Ernest M. Jenelle, 1711 Fox Run Ct., Vienna, Va. 22182

[21] Appl. No.: 124,429

[22] Filed: Sep. 21, 1993

Related U.S. Application Data

[63] Continuation of Ser. No. 761,499, Sep. 18, 1991, abandoned.

[51] Int. Cl.$^6$ .................................................. C02F 3/10
[52] U.S. Cl. ........................ 210/615; 210/616; 210/629; 210/903; 210/926
[58] Field of Search ........................ 210/615, 616, 210/629, 903, 926

[56] References Cited

U.S. PATENT DOCUMENTS

| | | | |
|---|---|---|---|
| 3,900,394 | 8/1975 | Rongved | 210/926 |
| 4,439,315 | 3/1984 | Whiteside | 210/926 |
| 5,076,929 | 12/1991 | Fuchs et al. | 210/629 X |
| 5,160,620 | 11/1992 | Lygren | 210/629 |

FOREIGN PATENT DOCUMENTS

| | | | |
|---|---|---|---|
| 60-118292 | 6/1985 | Japan | 210/926 |
| 2011795 | 7/1979 | United Kingdom | 210/926 |

*Primary Examiner*—Thomas S. Wyse
*Attorney, Agent, or Firm*—Cushman Darby & Cushman

[57] ABSTRACT

The present invention relates to a novel apparatus for enhancing the nitrification of wastewater, and a method of its use. The present apparatus comprises the addition of a plurality of submerged, fixed support means to an activated sludge system. These support means act as supports for autotrophic nitrification bacteria and are disposed in the activated sludge system so that the wastewater is substantially free of carbonaceous waste by the time it reaches the support media. A circulation system is used to bring the wastewater into contact with the support media so that nitrification can occur.

9 Claims, 8 Drawing Sheets

ACTIVATED SLUDGE PROCESS

TYPICAL FLOW DIAGRAM FOR ACTIVATED SLUDGE PROCESS EMPLOYING SEPARATE NITRIFICATION FACILITIES
SPECIAL PROCESS FOR RELIABLE NITRIFICATION

Typical Oxidation Ditch

SUBMERGED FIXED MEDIA FOR NITRIFICATION

This is a continuation of application Ser. No. 07/761,499, filed on Sep. 18, 1991, which was abandoned upon the filing hereof.

FIELD OF THE INVENTION

The present invention provides a process modification and typical apparatus for simplifying and improving the reliability of nitrification as part of the activated sludge for process wastewater treatment.

BACKGROUND OF THE INVENTION

Ammonia is an intermediate compound which results from the decomposition of proteins. It is a common constituent in all domestic wastewater, as mammals eliminate most excess nitrogen via the urinary pathway in the form of Urea. This compound is quickly hydrolyzed after leaving the body, which releases ammonia. At the pH range which is normal for natural water, ammonia exists as the ammonium ion in wastewater, and as the primary reduced form of inorganic nitrogen in natural water.

Federal Water Pollution control statutes have, as their objective, the restoration and maintenance of the chemical, physical, and biological integrity of the Nation's water supply. This has been accomplished through the pursuit of two goals. The first was to reduce pollution of surface water, and the second was to prohibit the discharge of toxic compounds in toxic amounts. Ammonia has been found to be toxic to some forms of aquatic life at rather low concentrations. As a result, the U.S. Environmental Protection Agency, under the auspices of the Federal Water Pollution Control Act of 1972, and subsequent Amendments, is now placing significant emphasis on the control of ammonia in wastewater discharges. This control is achieved through the use of the National or State Pollution Discharge Elimination System permit program.

A common method of wastewater treatment is the activated sludge method. A flow chart for a typical activated sludge treatment process is shown in FIG. 1. The figure only shows the activated sludge process itself, various procedures which may precede or follow the process are not shown. This process involves maintaining a biomass in suspension. The biological mass rapidly absorbs the organic (carbonaceous) material in the wastewater which is then oxidized and used to accomplish cell growth.

The principal means of reducing the ammonia concentration in the wastewater using an activated sludge process is through the biological oxidation of ammonia to nitrate.

The biomass which is used in the activated sludge process generally contains two types of bacteria, heterotrophs and autotrophs. The heterotrophs absorb carbonaceous material and transform it into energy and cell growth. These bacteria have a high rate of growth. The autotrophs absorb ammonia and oxidize it into nitrates. These bacteria have lower growth rates and cell yield, and are more temperature and pH sensitive than the heterotrophs. Also, the nitrifying bacteria prefer an environment where suitable surface area is provided upon which to grow.

The biomass is mixed with incoming wastewater and is fed into a tank for aeration. Aeration replenishes the oxygen consumed by the process and provides mixing to keep the biomass in suspension. In these conventional systems, several hours of aeration is provided to accomplish the cell synthesis and the associated oxidation and aging of new growth. Generally, this time is about six hours. This aeration period is necessary to maintain the proper physiological state of the biomass in order to produce good separation of the biomass from the wastewater in the clarification process, resulting in a clear, high quality effluent.

The oxidation of ammonia to nitrate is a sequential, two step, biological process which involves two types of autotrophs. The process is outlined below.

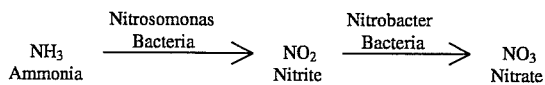

The ammonia is oxidized to nitrite by Nitrosomas bacteria, and then is oxidized to nitrate by Nitrobacter bacteria. These two bacterial groups are autotrophic bacteria and use the ammonia as an energy source.

Heterotrophic bacteria, which use the carbon based material as a source of energy, have a high cell yield and undergo rapid growth. In contrast, the autotrophic bacteria have a low cell yield and slow growth. The autotrophs are also more temperature and pH sensitive than the heterotrophic bacteria. In addition, they are strictly aerobic and require the presence of several mg/l of oxygen to achieve optimum activity.

In a conventional activated sludge process, after the aeration treatment of the waste water with the biomass, the biological mass is separated from the flow by gravitational clarification. The net growth of cell mass must be removed from the system in order to maintain proper balance between the cell mass and incoming organic matter. The remainder of the biomass is returned to the influent end of the aeration process where it is mixed with incoming wastewater.

Although some lightly loaded wastewater plants achieve a satisfactory level of nitrification, many problems exist with the reliability of current nitrification technology in the conventional activated sludge process. If the wastewater flow is high in carbonaceous material, the growth of the heterotrophic bacteria is so much greater than the growth of the autotrophic bacteria, that the nitrifying bacteria are overgrown and "washed out" with the sludge wasting process. This causes a substantial impairment in the ability of the conventional activated sludge process to successfully achieve reliable nitrification in a one process system.

It has been known to provide submerged media throughout the entire length of the aeration tank to act as biomass support. However these systems suffer from the same overgrowth and wash out problems which are present in other types of conventional activated sludge system.

Thus, in most plants which have a heavy carbonaceous load, nitrification can not be undertaken effectively as an integral part of the normal activated sludge process. As a result, it is often necessary to have a separate nitrification process to treat the wastewater following the removal of the carbonaceous material. These separate nitrifying processes generally consist of a second sludge process employing aeration, clarification and return sludge, or a nitrifying filter. Nitrifying filters employ suitable surface area for the support of a nitrification biomass.

Each of these separate nitrification processes are expensive to construct and operate. The second sludge process is essentially equivalent to an activated sludge process in terms of capital investment, operation and maintenance costs. In addition, the biomass which is produced is a weak, poor quality floc which results in a poor quality effluent after clarification.

Newer nitrifying filters employ plastic media of various shapes as support for the nitrification bacteria. These filters are often 20 to 30 feet deep and generally require pumping of the wastewater flow. This type of design is subject to operational problems in cold weather, as the filters are subject to icing. Other forms of fixed media, such as rotating biological contractors have been employed in an attempt to achieve reliable nitrification. In all cases, the natural sloughing of the filters results in poor quality effluent that in general requires additional treatment before discharge. These disadvantages represent significant capital and operating costs.

A flow chart illustrating a secondary nitrification treatment system is illustrated in FIG. 2.

One older treatment system did provide adequate nitrification under certain conditions, but was not an activated sludge system. Specifically, trickling filters have been recognized for years as providing a means for achieving nitrification. The older, rock filled filters, if loaded lightly with carbonaceous material would achieve nitrification at the lower depths, especially during the warmer months. This occurred for two reasons. The primary reason was that the carbonaceous material was absorbed in the upper layers of the filter. This provided the nitrifying biological population the opportunity to exist in the lower depths of the filter without the interference of heterotrophic overgrowth. In addition, the natural ventilation system of the filter provided an oxygen rich atmosphere.

SUMMARY OF THE INVENTION

The present invention relates to a novel means of adapting the activated sludge process by placement of an apparatus for enhancing nitrification, and a method of its use. The present apparatus comprises the addition of a plurality of submerged, fixed support means to a conventional activated sludge system. These support means act as supports for autotrophic nitrifying bacteria and are disposed in the activated sludge system so that the wastewater is substantially free of carbonaceous material by the time the wastewater reaches the support media. A circulation system is used to bring the wastewater into contact with the support media so that efficient nitrification can occur. This circulation system will normally be the conventional aeration system.

DETAILED DESCRIPTION OF THE PREFERRED EMBODIMENTS

The present invention provides an apparatus and method for simplifying and improving the reliability of the nitrification processes in conjunction with the activated sludge process of wastewater treatment. In particular, the present invention incorporates a plurality of submerged fixed supports into a activated sludge system. These supports are suitable for installation within existing activated sludge treatment systems without structural modification as well as for use in new construction. The surfaces of the fixed supports are used to support the growth of the autotrophic nitrification bacteria. This apparatus provides a suspended biomass for the heterotrophic bacteria to remove carbonaceous material, followed by a fixed bio-film support for nitrifiers in the latter part of the aeration tank. As a result, the nitrification of the wastewater can be effectively undertaken as an integral part of the activated sludge process without the overgrowth or washout problems, or the need to resort to expensive, separate nitrification steps, all of which are problems with prior activated sludge processes.

Figure 1:
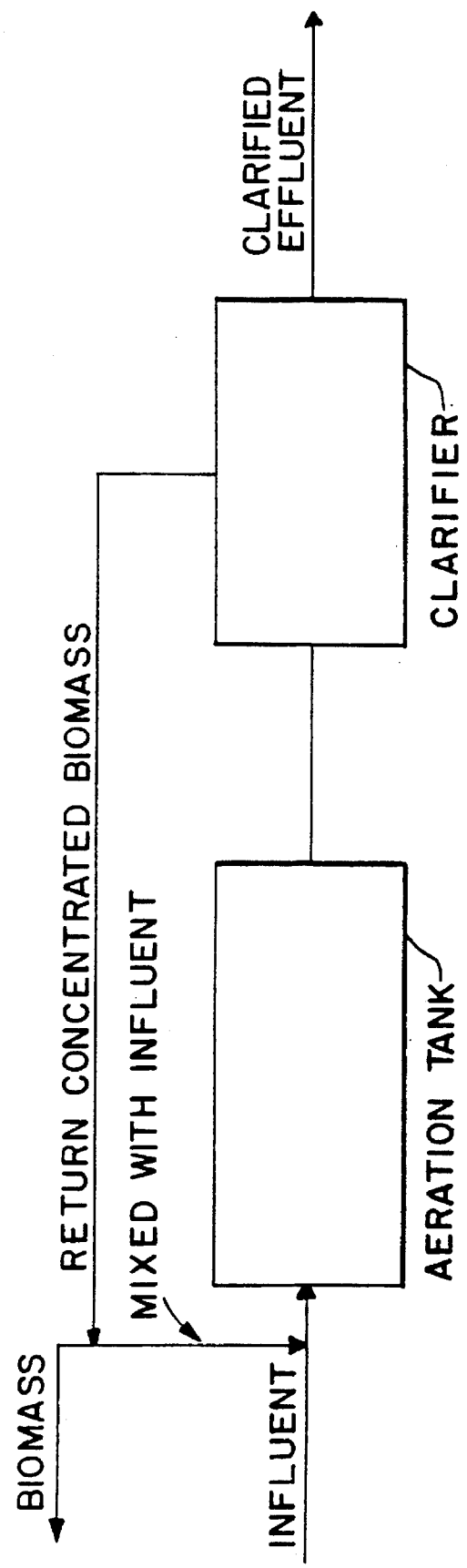
FIG. 1 is a flow chart diagram of the conventional activated sludge process.
Figure 2:
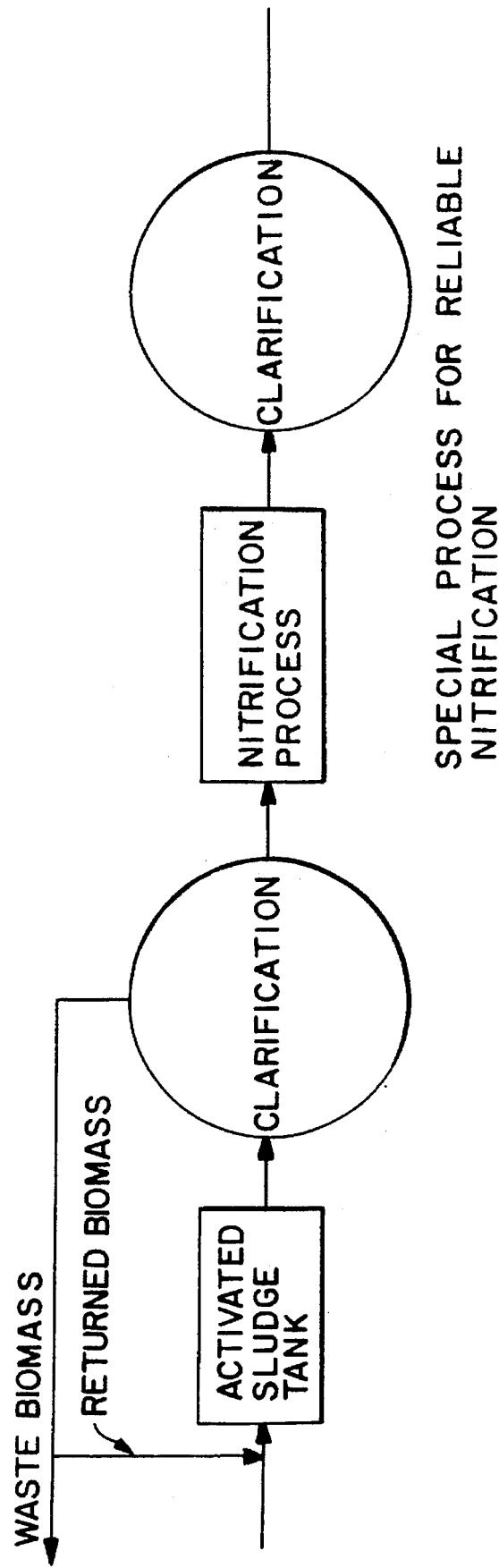
FIG. 2 is a flow chart diagram of a conventional activated sludge process which employs a separate nitrification facility.
Figure 3:
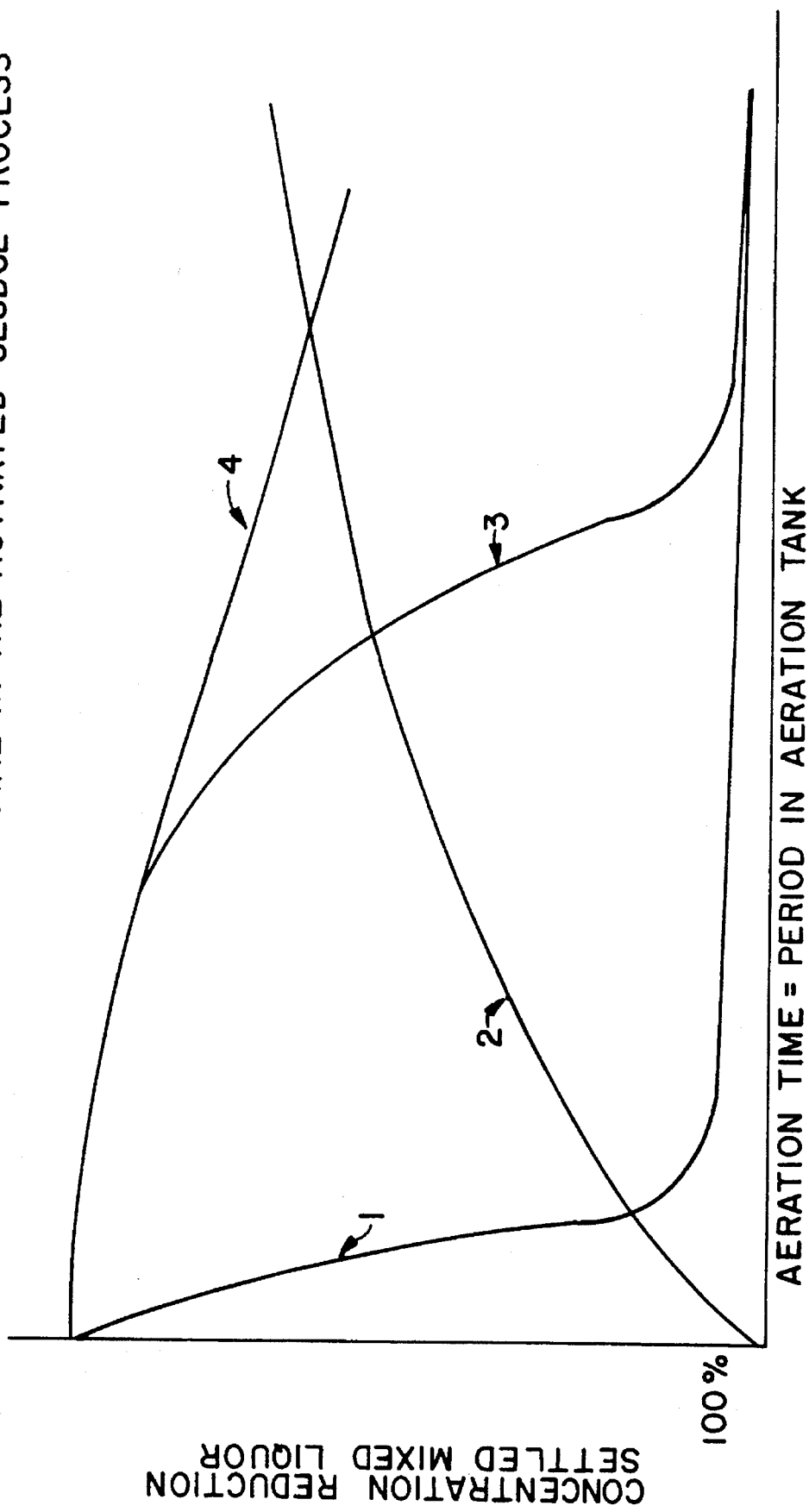
FIG. 3 is a graph showing BOD (carbonaceous matter) and ammonia removal over time in the activated sludge process.

The present invention takes advantage of the kinetics of heterotrophic absorption of the carbonaceous material from the wastewater. Specifically, it takes into account the fact that the carbonaceous material will be absorbed in the first section of the activated sludge tank. FIG. 3 shows the general kinetics of the absorption and oxidation of carbonaceous material by heterotrophic bacteria, and ammonia oxidation by nitrification bacteria. The actual kinetics will depend on a variety of factors including: the physiological state of the biomass; the concentration of the carbonaceous matter; the dissolved oxygen level in the wastewater; the pH of the flow; the temperature of the wastewater; and the design of the facility as it affects flow conditions.

As shown by curve (1) in FIG. 3, carbonaceous matter is rapidly absorbed onto the biomass when the activated sludge is mixed with the incoming flow. This process occurs in a matter of minutes. At this point, the cell mass could be allowed to settle in order to produce a clarified decant, however nitrogen levels in the decant would remain high and the cell mass would need to be aerated for a sufficient period in a separate tank to accomplish the oxidation of the absorbed organic matter, and maintain the biomass in the correct physiological state.

The heterotrophs convert the absorbed carbonaceous material into energy and cell mass by oxidation. This oxidation reaction takes a longer amount of time than the absorption process. Some of the absorbed material is synthesized into cellular material which results in an increase in cell mass. Curve 2 of FIG. 3 shows the rate of oxidation of the absorbed cellular material by the heterotrophic bacteria. This oxidation rate is first order and achieves a near zero rate in approximately 5 to 6 hours.

Nitrification oxidation generally lags behind the absorption of the carbonaceous material. Curve 4 represents a nitrification process which is inefficient and achieves little in the way of significant nitrification. Curve 3 represents a process of the present invention, where the nitrification is taking place on fixed media located in the last one-half to one-third of the activated sludge aeration tank. This maintenance of a nitrifying biological population on the fixed media produces optimal nitrification of the ammonia without the need to resort to a separate nitrification system.

The present apparatus consists of an activated sludge system which contains fixed surfaces in the downstream portion of the activated sludge system. The fixed surfaces act as a support medium for the autotrophic bacteria which conduct the nitrification of the wastewater. When the activated sludge system is in operation, the fixed surfaces should be substantially submerged, and preferably, should be completely submerged. Providing the fixed surface areas in this area of the activated sludge system is advantageous, as little carbonaceous matter remains available to support heterotrophic growth on the fixed surfaces. Thus, the nitrifying bacteria (autotrophs) can survive with little or no competition from the more prolific heterotrophic growth, even though both processes are occurring in the same unit.

However, it is preferred that a small amount of heterotrophic growth be present among the nitrification material in order to provide a gelatinous mass for support on the fixed surface. The presence of the heterotrophs with the nitrification bacteria enhances adhesion of the nitrifiers to the surfaces of the fixed media. The flocculating properties of the suspended heterotrophs increase the flocculation of sloughing nitrifiers, which enhances effluent quality.

Heterotrophic and autotrophic bacteria which are conventionally used in activated sludge processes are suitable for use in the present invention. The autotrophs are attached as bio-films to the support media using conventional means for attaching bacteria to supports. A preferred means of attaching the biofilms to the support media is through the gelatinous nature of the biomass.

In particular, the present apparatus comprises an activated sludge system, for example, a tank based system, open vat based system, or an oxidation ditch based system, where the submerged, fixed supports are located such that the bulk of the carbonaceous material has been absorbed by the heterotrophic biomass prior to the waste stream reaching the fixed media. Generally, this means that the submerged fixed media will be located in the last one-half or less of the tank or vat, preferably in the last one-third or less of the tank or vat. When the present apparatus is used in an oxidation ditch, the submerged, fixed media should be placed in the downstream portion of the oxidation ditch, just prior to the effluent exit.

The present apparatus also contains circulation means for circulating the waste water across or through the fixed media. This is done in order to bring the waste water into contact with the nitrification bacteria on the fixed media, and to provide oxygen to the fixed media. Any suitable circulation means can be used which accomplishes good oxygen and waste water circulation. Examples of suitable means include any mechanical circulator or aerator, or a diffused bubble aeration system.

A principal advantage of the present invention is the fact that suitable aeration and circulation must be provided as part of a conventional system. Hence, no additional tankage or energy input is needed to accomplish the improved nitrification achievable by the installation of the fixed media.

Figure 4:
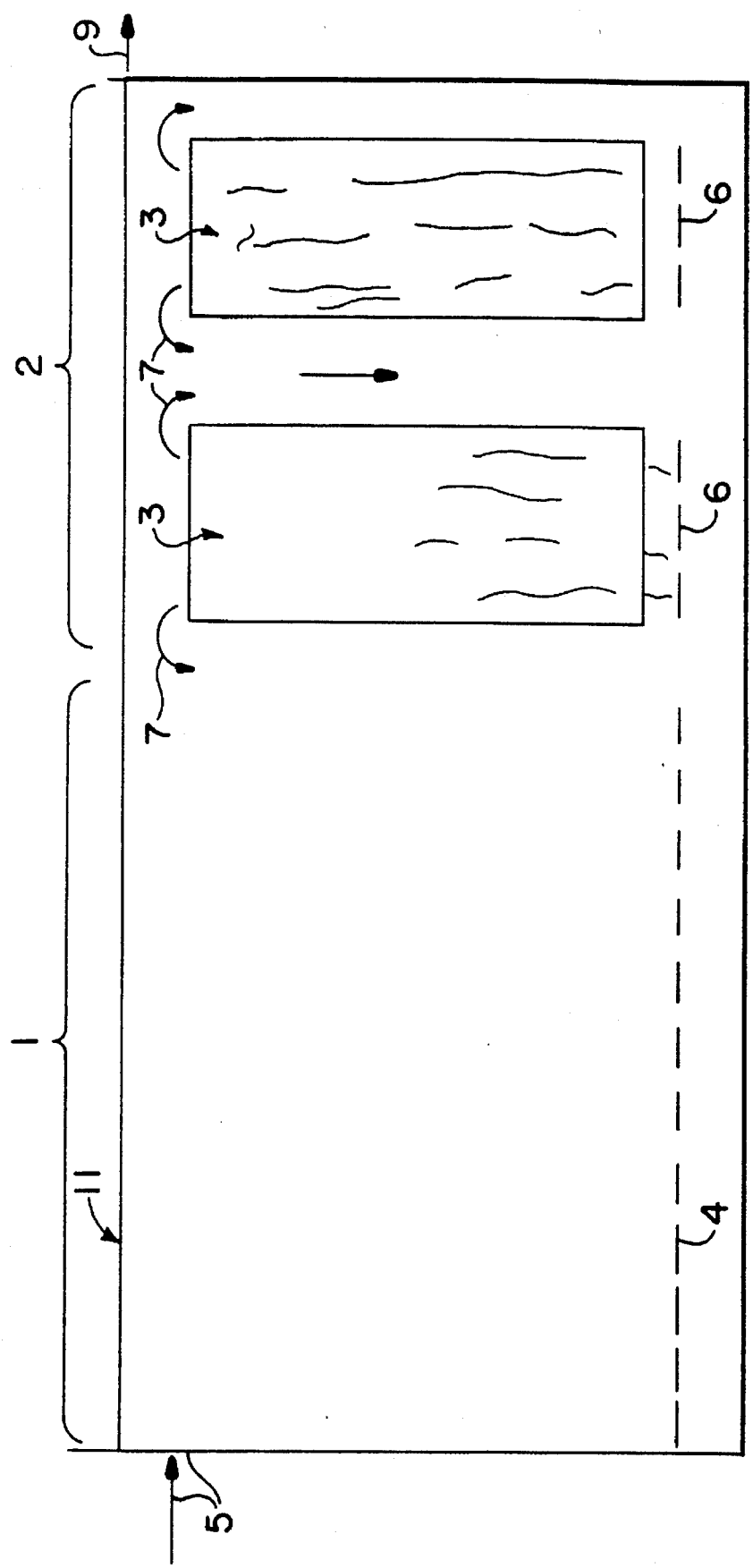
FIG. 4 is a elevation view of the activated sludge tank of the present invention.
Figure 8:
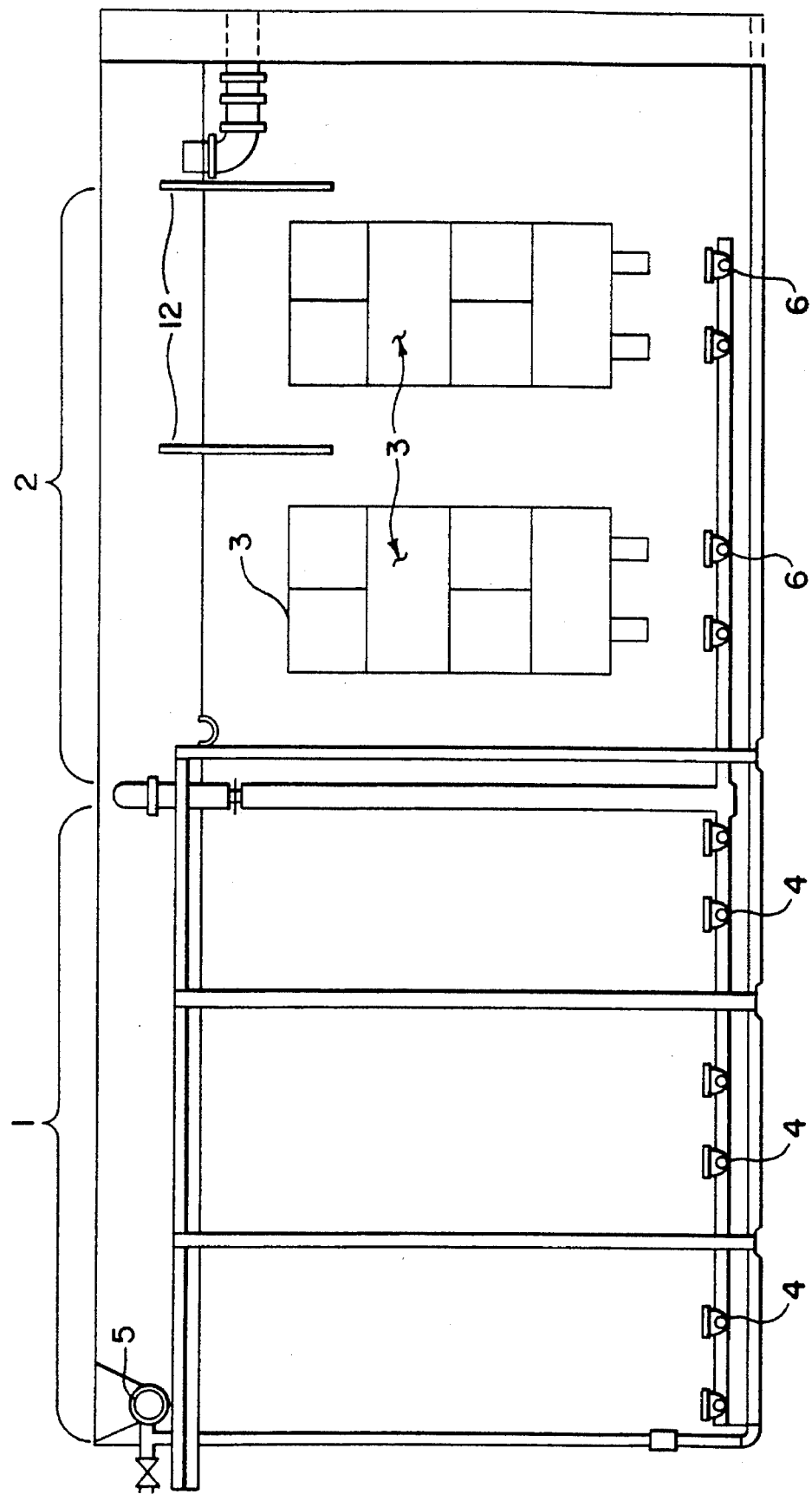
FIG. 8 shows a side view of an aeration tank according to the present invention.

Examples of the preferred apparatus of the present invention are shown in FIGS. 4 and 8. The sewage is mixed with a biomass and is added to the tank through influent 5. The liquid level 11 of the tank is maintained such that the fixed supports are submerged. Absorption and partial oxidation of carbonaceous material takes place by the heterotrophic bacteria in zone 1. Ammonia absorption, nitrification, and further oxidation of the carbonaceous material takes place in zone 2. Air diffusers 4, are located so as to provide aeration to the biomass in zone 1. Air diffusers 6 are disposed so as to provide circulation of the wastewater through the stacks of fixed media 3, which contain the nitrifying bacteria. In addition, air diffusers 6 provide oxygen to both the heterotrophic biomass and the nitrifying bacteria, which they need to function. The waste water is circulated through the stacks in the current pattern shown by the arrows 7. Only two stacks of fixed media 3 are shown in this figure, by way of illustration. Baffles 12 may be present between the stacks to assist water flow in the correct flow pattern. In an actual, operating system, these stacks would cover $\frac{1}{3}$ to $\frac{1}{2}$ of the aeration tank, preferably that portion farthest from the waste water influent 5. After being treated, the wastewater goes through effluent pipe 9 to a clarifier.

Figure 5:
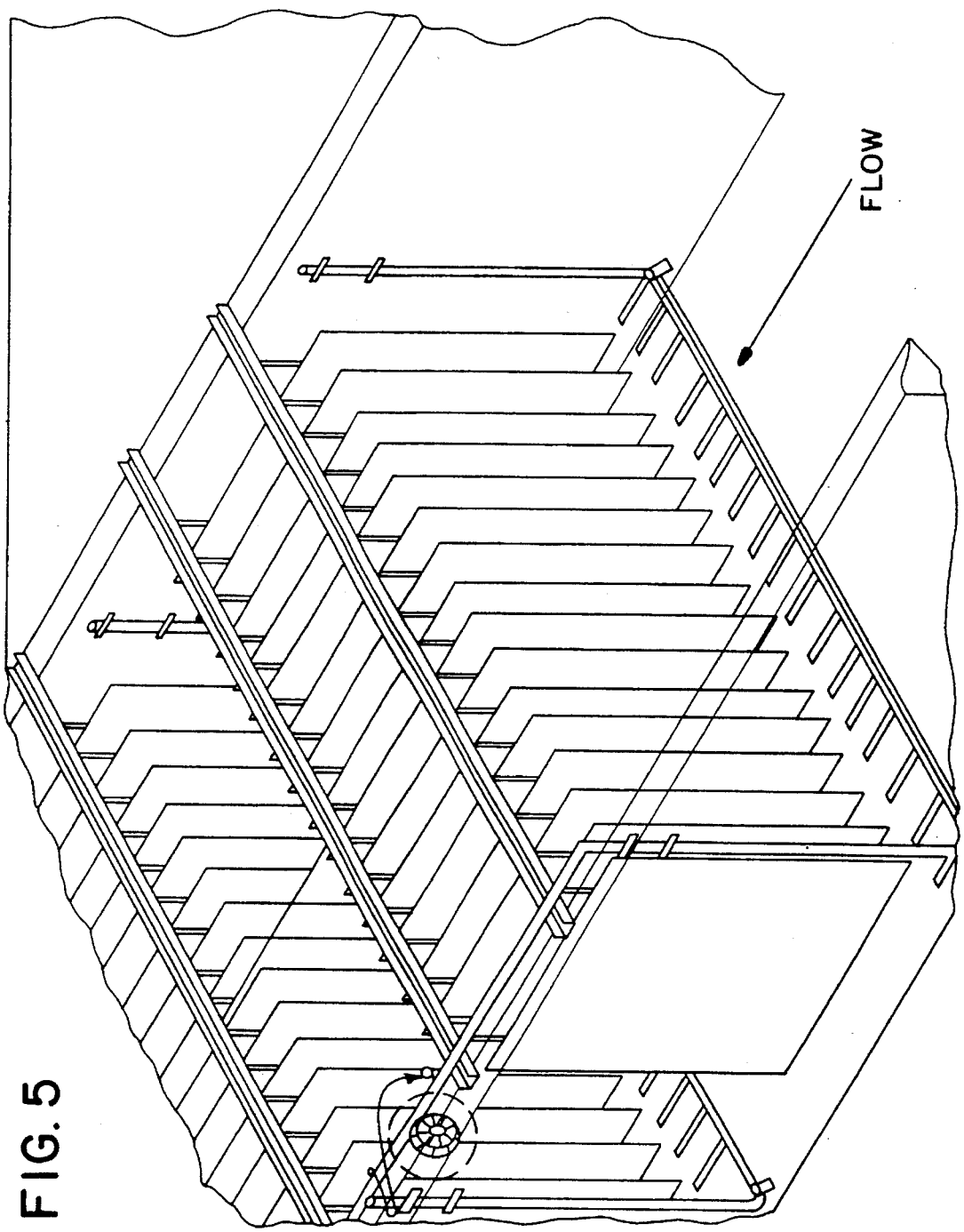
FIG. 5 shows a typical plate arrangement for use as a support means for the present invention.
Figure 6:
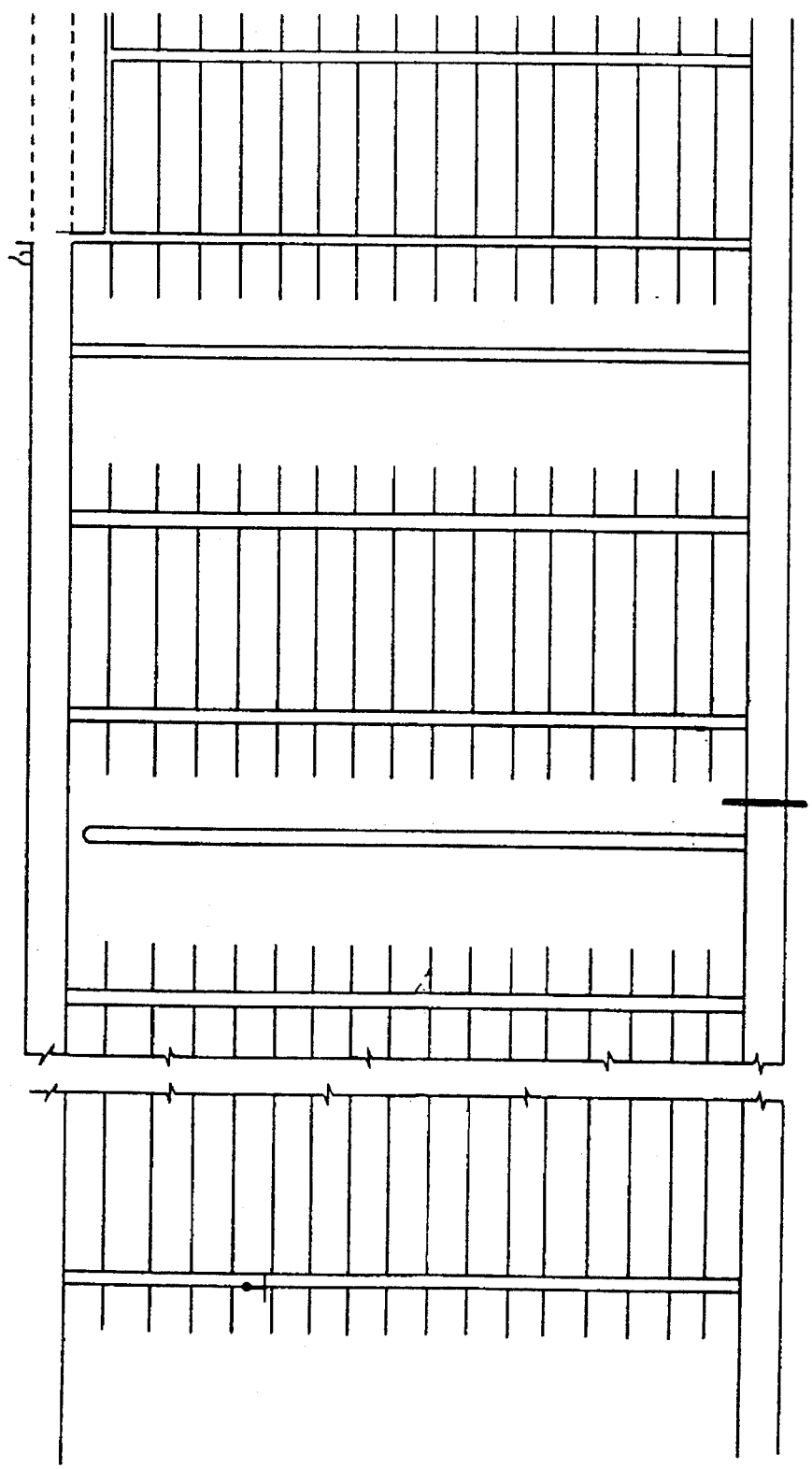
FIG. 6 shows a typical plate arrangement for use as the support means of the present invention.

The fixed submerged surfaces may be present in a variety of shapes and arrangements. The shape and material of the fixed submerged surfaces are not critical. Any media form which provides a surface is suitable which will successfully act as a support for the nitrification bacteria and will allow suitable circulation of the wastewater across the surfaces in order to expose the biofilm to the liquid and to provide oxygen to the biofilm. Types of suitable surfaces include plates, a packing, such as ropes and beads, and a honeycomb type structure. Illustrations of some of the types of structural systems which are suitable for use in the present invention are shown in FIGS. 5, 6 and 8. The structures can be made from a variety of materials, which are known to support biofilms, such as plastics which are used in conventional secondary nitrification filters. One skilled in the art can determine suitable substrate media without undue experimentation.

A preferred structure is an arrangement of fixed surfaces with vertical or inclined passages. Water can be circulated through these passages using rising air bubbles which both promote circulation and provide oxygen to the heterotrophic biomass and the nitrifying bacteria.

Figure 7:
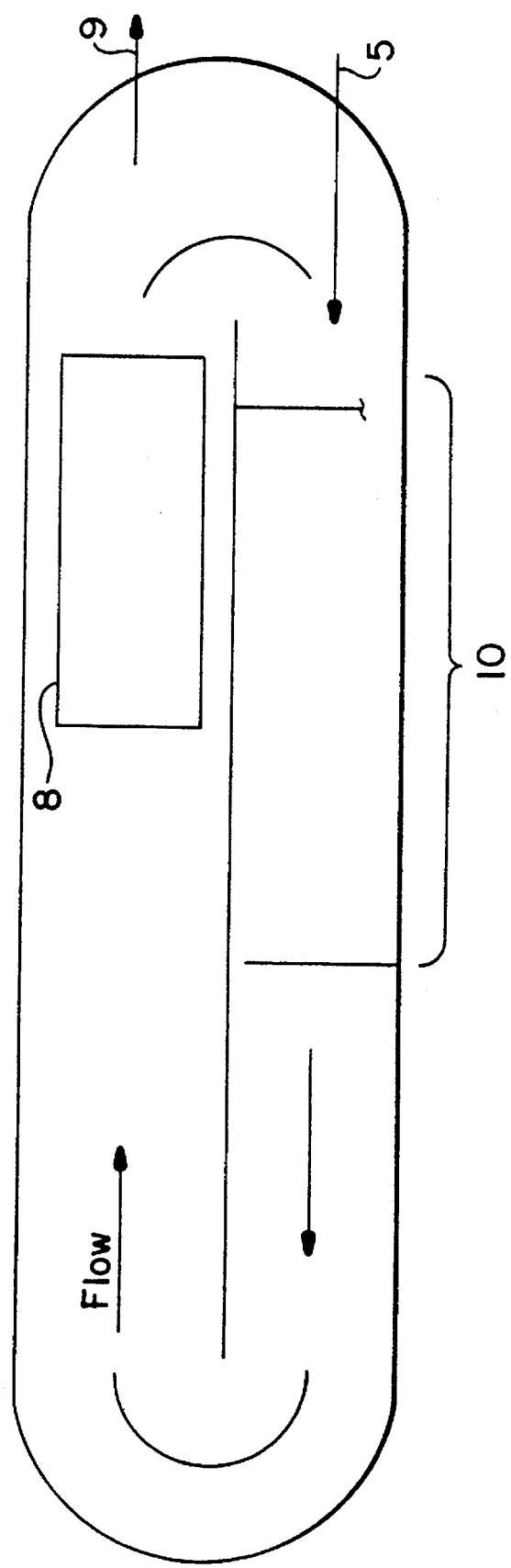
FIG. 7 shows the present invention used in an oxidation ditch.

Preferred activated sludge systems include tank based activated sludge systems and oxidation ditch activated sludge systems. FIG. 7 illustrates the location of the submerged fixed media when the present invention is used in an oxidation ditch. The fixed media 8 are located in the downflow portion of the oxidation ditch, away from the location of the incoming flow 8, and near the outflow 9. This allows the absorption of the carbonaceous material to be generally complete prior to passing the waste water through the fixed media, and thus problems with heterotrophic overgrowth of the nitrification bacteria are minimized. Most of the absorption of the carbonaceous material takes place in zone 10.

The circulation of the wastewater through the submerged plates can be carried out by any suitable means which will bring the wastewater into contact with biofilm, and which will provide oxygen to the biofilm. Suitable methods include mechanical means of liquid aeration and circulation, and fine bubble diffused air.

A preferred method of circulation of the wastewater is the use of an aeration system to circulate the wastewater across the fixed surfaces. This provides a good circulation to bring the wastewater into contact with the biological film, and provides good aeration of the bacteria on the fixed films.

The present invention also relates to a method of treating waste water using the present apparatus. This method involves treating waste water in an apparatus as described above. The wastewater is mixed with a biomass containing heterotrophic bacteria, as in a conventional activated sludge process. The heterotrophic bacteria are allowed to absorb the carbonaceous material, and then the waste water is passed through submerged, fixed media which support a biofilm of autotrophic nitrification bacteria. This results in the reduction of the amount of ammonia in the wastewater to acceptable levels in a single, integral process, without the need to resort to secondary nitrification, and without the problems of overgrowth or washout.

Preferably, the present process should be carried out at temperatures and pH's which optimize the nitrification process. The optimum nitrification temperature is around 30° C. The reaction becomes seriously inhibited at temperatures outside of the range 7° to 33° C. In addition, the pH of the water should be maintained between 6 and 9 in order to avoid inhibition. The dissolved oxygen level should be maintained above 2.5 mg/l. However, since these characteristics of waste water are seldom controlled, suitable film surface area should be provided to assure reliable nitrification under the expected design conditions.

What is claimed is:

1. A method of treating wastewater to improve nitrification as an integral single sludge process, said method comprising:
   (a) mixing incoming wastewater with an activated sludge biomass of heterotrophic bacteria and aerating and mixing the mixture;
   (b) allowing the heterotrophic bacteria to absorb substantially all carbonaceous material in the waste water; and thereafter
   (c) passing the wastewater/biomass mixture over plurality of substantially submerged fixed biological support means which have autotrophic nitrification bacteria disposed thereon.

2. A method according to claim 1, wherein the method is carried out at a temperature in the range 7° to 33° C.

3. A method according to claim 1, wherein the method is carried out at a pH range of 6 to 9.

4. A method according to claim 1, wherein the fixed support means are selected from the group consisting of plates, a packing material, honeycomb structures, ropes and beads suitable for supporting fixed biological growths.

5. A method according to claim 1, wherein the wastewater/biomass mixture is aerated while being passed over the substantially submerged fixed biological support means.

6. A method according to claim 1, wherein the method is conducted in a tank.

7. A method according to claim 1, wherein the container is an oxidation ditch, and the plurality of fixed support means is disposed in a downflow portion of the ditch.

8. A method according to claim 1, wherein the fixed biological support means are completely submerged in the wastewater.

9. A method for improving nitrification in a single sludge process in which waste water is treated by the combination of steps which consists essentially of:
   (a) mixing incoming wastewater with an activated sludge biomass of heterotrophic bacteria and aerating and mixing the mixture;
   (b) allowing the heterotrophic bacteria to absorb substantially all carbonaceous material in the waste water; and
   (c) passing the wastewater/biomass mixture over a plurality of substantially submerged fixed biological support means which have autotrophic nitrification bacteria disposed thereon.

* * * * *